(12) United States Patent
Koch et al.

(10) Patent No.: US 12,024,127 B2
(45) Date of Patent: Jul. 2, 2024

(54) POP-OUT VEHICLE FRUNK AND TRUNK

(71) Applicant: Toyota Motor Engineering & Manufacturing North America, Inc., Plano, TX (US)

(72) Inventors: Samuel David Koch, Dexter, MI (US); William Castleman, Canton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 28 days.

(21) Appl. No.: 17/836,859

(22) Filed: Jun. 9, 2022

(65) Prior Publication Data

US 2023/0398938 A1    Dec. 14, 2023

(51) Int. Cl.
*B60R 5/02* (2006.01)
*B62D 25/08* (2006.01)
*B62D 25/12* (2006.01)

(52) U.S. Cl.
CPC .............. *B60R 5/02* (2013.01); *B62D 25/087* (2013.01); *B62D 25/12* (2013.01)

(58) Field of Classification Search
CPC ........... B60R 5/02; B60R 5/04; B60R 13/013; B62D 25/087; B62D 25/105; B62D 25/12
USPC ....................... 296/37.1, 76, 190.11
See application file for complete search history.

(56) References Cited

U.S. PATENT DOCUMENTS

| | | |
|---|---|---|
| 2,576,385 A | 11/1951 | Bigsby |
| 2,626,179 A | 1/1953 | Gonzalez |
| 2,953,287 A | 9/1960 | Werner |
| 3,627,158 A | 12/1971 | Kobasic |
| 4,455,948 A | 6/1984 | Torres |
| 4,969,793 A | 11/1990 | Pawl |
| 9,475,371 B2 | 10/2016 | LaBiche |
| 9,511,801 B2 | 12/2016 | Murray et al. |
| 10,293,737 B2 | 5/2019 | Granell Peniche et al. |
| 10,508,009 B2 | 12/2019 | Nedelman |
| 11,142,129 B2 | 10/2021 | Howard, II et al. |

(Continued)

FOREIGN PATENT DOCUMENTS

| | | |
|---|---|---|
| DE | 19619126 | 11/1997 |
| DE | 102005055188 | 5/2007 |

(Continued)

OTHER PUBLICATIONS

English translation of DE 10 2019 001 342; retrieved via Patent-Translate located at www.epo.org. (Year: 2023).*

*Primary Examiner* — Jason S Daniels
(74) *Attorney, Agent, or Firm* — Snell & Wilmer LLP

(57) ABSTRACT

Systems and vehicles including a pop-out trunk/frunk and methods of using the same. A system may include a storage compartment. The storage compartment may have a base configured to receive a payload. The system may further include a trunk/frunk area. The trunk/frunk area may be configured to receive the storage compartment. The system may further include a mechanism. The mechanism may be attachable to the storage compartment and configured to traverse the storage compartment between an up position where the storage compartment extends up and out of the trunk/frunk area and a down position where the storage compartment is within the trunk/frunk area.

14 Claims, 3 Drawing Sheets

(56) References Cited

U.S. PATENT DOCUMENTS

| | | | | |
|---|---|---|---|---|
| 11,208,046 B2 * | 12/2021 | Liu | ................... | B62D 25/087 |
| 11,708,033 B2 * | 7/2023 | Weber | ................... | B60R 5/02 |
| | | | | 296/37.5 |
| 2022/0234507 A1 * | 7/2022 | Kowollik | ................ | B60R 5/02 |

FOREIGN PATENT DOCUMENTS

| | | | | |
|---|---|---|---|---|
| DE | 102005043490 | | 8/2013 | |
| DE | 102017010161 A1 * | | 7/2018 | |
| DE | 102017011984 A1 * | | 6/2019 | |
| DE | 102019004286 B3 * | | 4/2020 | ............... B60R 5/02 |
| DE | 102019001342 A1 * | | 8/2020 | ............... B60R 5/02 |
| DE | 102019004010 A1 * | | 12/2020 | ............... B60R 5/02 |
| GB | 2530377 | | 3/2016 | |

* cited by examiner

POP-OUT VEHICLE FRUNK AND TRUNK

BACKGROUND

1. Field

The present disclosure is directed to frunk and trunk compartments of vehicles and methods of using the same.

2. Description of the Related Art

Users (e.g., drivers and/or passengers) of vehicles may need to access the trunk and/or frunk of their vehicle for various reasons, such as, storing and retrieving items. Frunks have been increasing in popularity due to electric, mid-engined, and rear-engined vehicles creating space for a frunk by design. The storage compartment of the frunk and/or the trunk of a vehicle may be difficult to reach based on the relatively low or high distance from the ground as well as the depth of the storage compartment. For example, an SUV or a truck having a frunk that is relatively high from the ground may be difficult to reach. In another example, a sports car that has a deep frunk that is too close to the ground may require more substantial bending.

Therefore, there is a need for a pop-up frunk and trunk for a vehicle to increase ergonomics for users.

SUMMARY

Systems and vehicles including pop-up trunks and frunks as well as methods of using the same are disclosed herein. A storage compartment may be traversed between an up and/or outward position and a down position by a 4-bar link or a 5-bar link mechanism. In the up position, the storage compartment may extend up and/or out of the vehicle for easy access and, in the down position, the storage compartment may be retracted and locked and secured into the vehicle to be housed.

The 4-bar link mechanism may pivot about a trunk or frunk area configured to receive the storage compartment. The mechanism may be activated by pulling or pushing the storage compartment or by motor actuation. The 5-bar link mechanism may pivot about the trunk or frunk area and a trunk or frunk lid is configured to enclose the trunk or frunk area, respectively. The 5-bar link mechanism may be automatically activated by lifting or closing the trunk lid manually, semi-automatically, or automatically.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

The systems, vehicles, and methods described herein enable users (e.g., drivers, passengers, etc.) to have convenient, easy and ergonomic access to a frunk and/or a trunk of a vehicle. A system may have a storage compartment. The storage compartment may have a base to receive a payload. The system may further include a trunk/frunk area. The trunk/frunk area may receive and house the storage compartment. The system may further include a mechanism. The mechanism may be attachable to the storage compartment. The mechanism may advantageously traverse the storage compartment between a down or stored position and an up and out position. In the down position, the storage compartment may be completely inside the trunk/frunk area and locked in place (e.g., secured to the body or the frame of the vehicle). In the up position, the storage compartment may extend out of the trunk area. As such, the storage compartment may be closer to the user and enable easier and ergonomic access to the storage compartment and/or the contents therein. In the down position, the storage compartment may be housed in the trunk area and hidden away, allowing the trunk/frunk to be closed.

The mechanism may be a 4-bar link or a 5-bar link mechanism. A 4-bar link mechanism may be activated by pulling the storage compartment to extend the storage compartment out of the vehicle and pushing the storage compartment to retract the storage compartment into the vehicle. A 5-bar link mechanism may be activated by opening a lid of the trunk/frunk to extend the storage compartment out of the vehicle and closing the lid of the trunk/frunk to retract the storage compartment into the vehicle.

Figure 1:
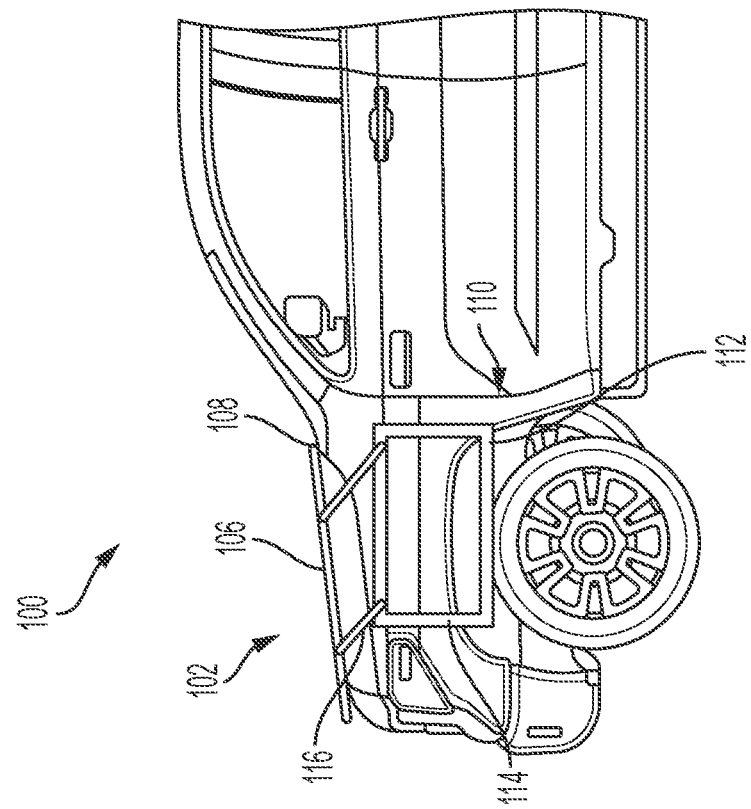
FIG. 1 illustrates a schematic view of a vehicle having a closed frunk according to an aspect of the present disclosure.

FIG. 1 illustrates a schematic view of a vehicle 100 having a frunk 102 in a down position (e.g., a closed and locked position). The vehicle 100 is a conveyance capable of transporting a person, an object, or a permanently or temporarily affixed apparatus. The vehicle 100 may have an automatic or manual transmission. The vehicle 100 may be a self-propelled wheeled conveyance, such as a car, an SUV, a truck, a bus, a van or other motor or battery driven vehicle. For example, the vehicle 100 may be an electric vehicle, a hybrid vehicle, a plug-in hybrid vehicle, a fuel cell vehicle, or any other type of vehicle that includes a motor/generator. The vehicle 100 may have a frunk 102 to store items within. In some embodiments, the vehicle 100 may have a trunk in addition to or in lieu of the frunk 102.

Figure 2:
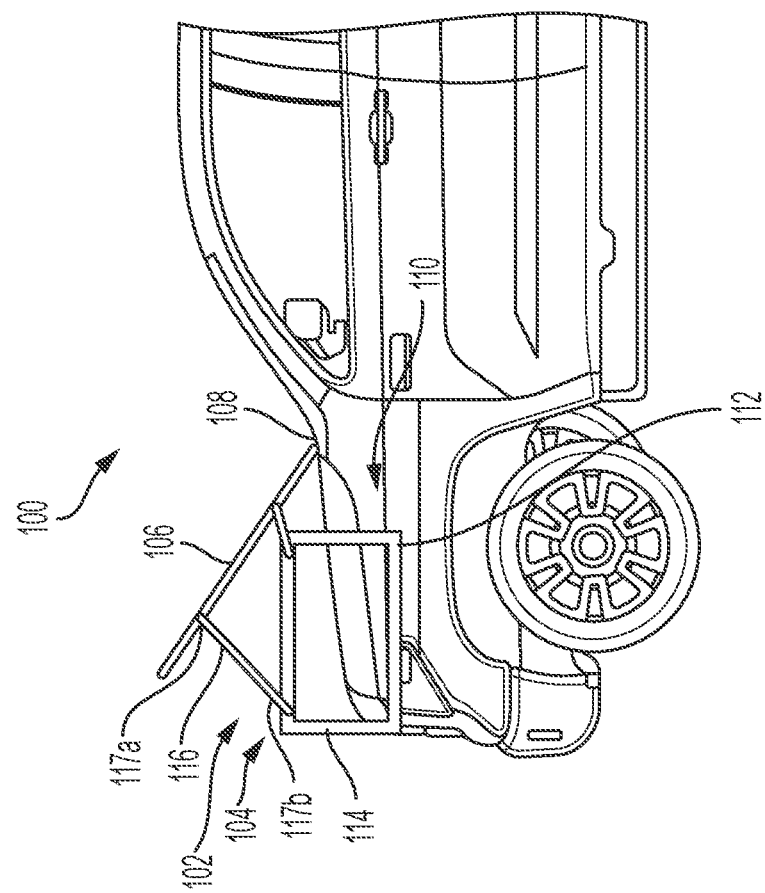
FIG. 2 illustrates a schematic view of the vehicle of FIG. 1 having an open frunk according to an aspect of the present disclosure.

FIG. 2 illustrates a schematic view of the vehicle 100 of FIG. 1 having the frunk 102 in an up position (e.g., an open position). The frunk 102 includes a trunk area 104 and a trunk lid 106 (e.g., a hood). For instance, the trunk area 104 is located at a front of the vehicle 100. The trunk lid 106 is configured to rotate upon a hinge 108 to expose the trunk area 104 in the open configuration. The frunk 102 further comprises a storage compartment 110. The trunk area 104 is configured to receive the storage compartment 110. For instance, the trunk area 104 is sized and shaped to align with the storage compartment 110. In various embodiments, the trunk area 104 may be larger or slightly larger than the storage compartment 110.

In various embodiments, the storage compartment includes a base 112 configured to receive a payload. The storage compartment 110 may further comprise a plurality of walls 114 extending from the base 112, defining a cavity within the storage compartment 110. The plurality of walls 114 surround the base 112 to retain the payload area on the base. For instance, in various embodiments, the storage compartment 110 may shaped as a box (e.g., the base 112 with the plurality of side walls 114). In various embodiments, the storage compartment 110 may be only a flat horizontal platform (e.g., the base 112).

The frunk 102 includes a mechanism 116 (e.g., a link mechanism, a lifting mechanism). The mechanism 116 may be coupled to the trunk lid 106. Further, the mechanism 116 is attachable (e.g. configured to attach, couple, etc.) to the storage compartment 110. For instance, the mechanism 116 may have a first end 117a coupled to the trunk lid 106 and a second end 117b coupled to the storage compartment 110.

The mechanism 116 is configured to traverse the storage compartment 110 between an up position and a down position. In the up position (e.g., FIG. 2), the storage compartment 110 may extend out of the trunk area 104. In the down position (e.g., FIG. 1), the storage compartment 110 may be fully received within the trunk area 104. In various embodiments, the second end 117b of the mechanism 116 may be coupled to the frunk 102. Accordingly, the mechanism 116 is configured to traverse the frunk 102 out of the vehicle 100. The frunk 102 may include a surface, a lining, a frame, etc. making up the entire trunk area 104 such that when the frunk 102 is removed, an undercarriage (e.g., frame under the main cabin of the vehicle) may be exposed.

Figure 3:
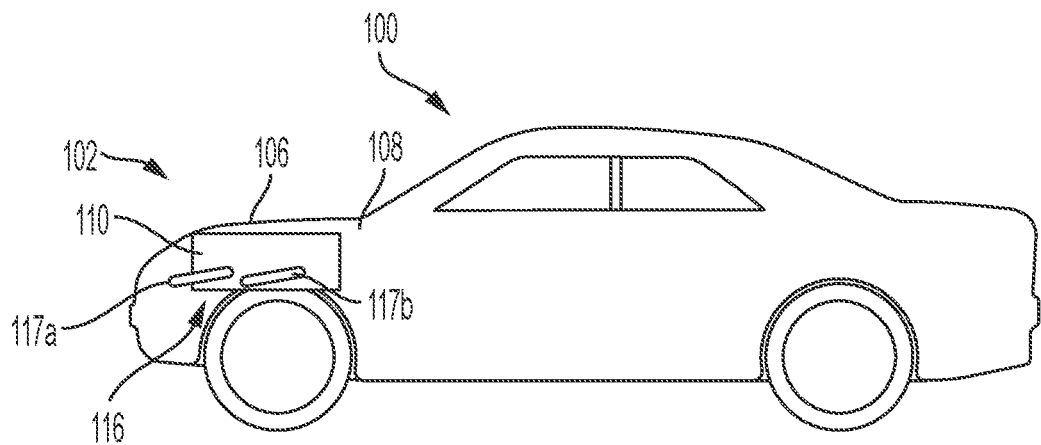
FIG. 3 illustrates a schematic view of a vehicle having a closed frunk according to an aspect of the present disclosure.
Figure 4:
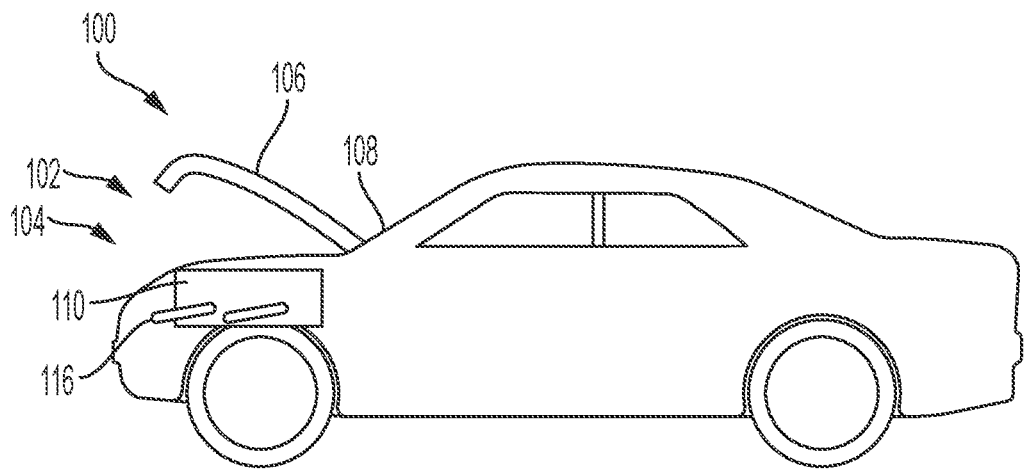
FIG. 4 illustrates a schematic view of the vehicle of FIG. 3 having an open frunk and a storage compartment in a down position according to an aspect of the present disclosure.
Figure 5:
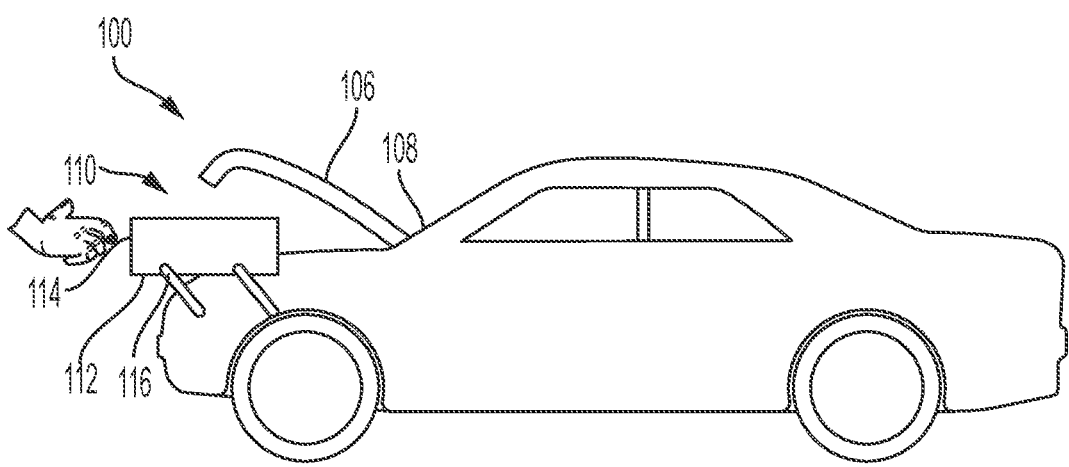
FIG. 5 illustrates a schematic view of the vehicle of FIG. 3 having an open frunk and a storage compartment in an up and out position according to an aspect of the present disclosure.

FIG. 3 illustrates a schematic view of a vehicle having a closed frunk, FIG. 4 illustrates a schematic view of the vehicle of FIG. 3 having an open frunk and a storage compartment in a down position, and FIG. 5 illustrates a schematic view of the vehicle of FIG. 3 having an open frunk and a storage compartment in an up position.

Referring briefly to FIGS. 3-5, the mechanism 116 may be coupled to the frunk 102 instead of the trunk lid 106. Further, the mechanism 116 is attachable (e.g., configured to attach, couple, etc.) to the storage compartment 110. For instance, the first end 117a may be coupled to the frunk 102 and the second end 117b may be coupled to the storage compartment 110. The storage compartment 110 may be removably detachable from the mechanism 116 so that a user can remove the entire storage compartment 110 (and its contents) and place it on the ground.

The mechanism 116 is configured to traverse the storage compartment 110 between an up position and a down position. In the up position (e.g., FIG. 5), the storage compartment 110 may extend up and out of the trunk area 104. In the down position (e.g., FIG. 4), the storage compartment 110 may be fully received within the trunk area 104. In various embodiments, the first end 117a of the mechanism 116 may be coupled to the undercarriage (e.g., frame under the main cabin of the vehicle) and the second end 117b is coupled to the frunk 102. Accordingly, the mechanism 116 is configured to traverse the frunk 102 out of the vehicle 100. The frunk 102 may include a surface, a lining, a frame, etc. making up the entire trunk area 104 such that when the frunk 102 is removed, the undercarriage may be exposed.

Referring now to FIGS. 1-5, in various embodiments, the mechanism 116 is a 4-bar link mechanism. For instance, the mechanism 116 includes a plurality of bars, or links, coupled in a closed-chain (e.g., a loop) configuration. For instance, each bar is coupled to an adjacent bar via a joint. As such, the 4-bar link mechanism is configured to pivot about the trunk area 104. The mechanism 116 may be configured to be activated by opening the trunk lid 106. For instance, when the trunk lid 106 is in the up position, the bars of the 4-bar link mechanism (i.e., mechanism 116) may begin to rotate about their respective joints, thus bringing the storage compartment 110 toward the user. In various embodiments, the mechanism 116 may be activated by pulling or pushing the storage compartment 110. For instance, the user may pull on the storage compartment 110 to move the storage compartment 110 toward the user, thus rotating the bar of the mechanism 116 coupled to the storage compartment 110 about its joint. In various embodiments, the mechanism 116 may be activated by motor actuation. For example, a motor may be used to automatically rotate the bar of the mechanism 116 so the storage compartment 110 can move between the down position and the up position, and vice versa. In various embodiments, the mechanism 116 may be activated by a combination of manual, semi-automatic, or automatic actuations.

In various embodiments, the mechanism 116 is a 5-bar link mechanism. Similarly, the mechanism 116 includes a plurality of bars, or links, coupled in a closed-chain (e.g., a loop) configuration. For instance, each bar is coupled to an adjacent bar via a joint. As such, the 5-bar link mechanism is configured to pivot about the trunk area 104 with two degrees of freedom. The storage compartment 110 may thus be more adaptably positioned. As described above with reference to the 4-bar link mechanism, the 5-bar link mechanism may be activated by lifting or closing the trunk lid manually, semi-automatically, and/or automatically.

In various embodiments, the mechanism 116 includes a plurality of cables. The cables may be flexible cables that lift and move the storage compartment 110 and/or the frunk 102 when the trunk lid 106 is opened. The plurality of cables may be four cables. For instance, each wall 114 or corner of the storage compartment 110 and/or the frunk 102 may be coupled to a first end of a cable and a second of the cable may be coupled to the trunk lid 106.

Figure 6:
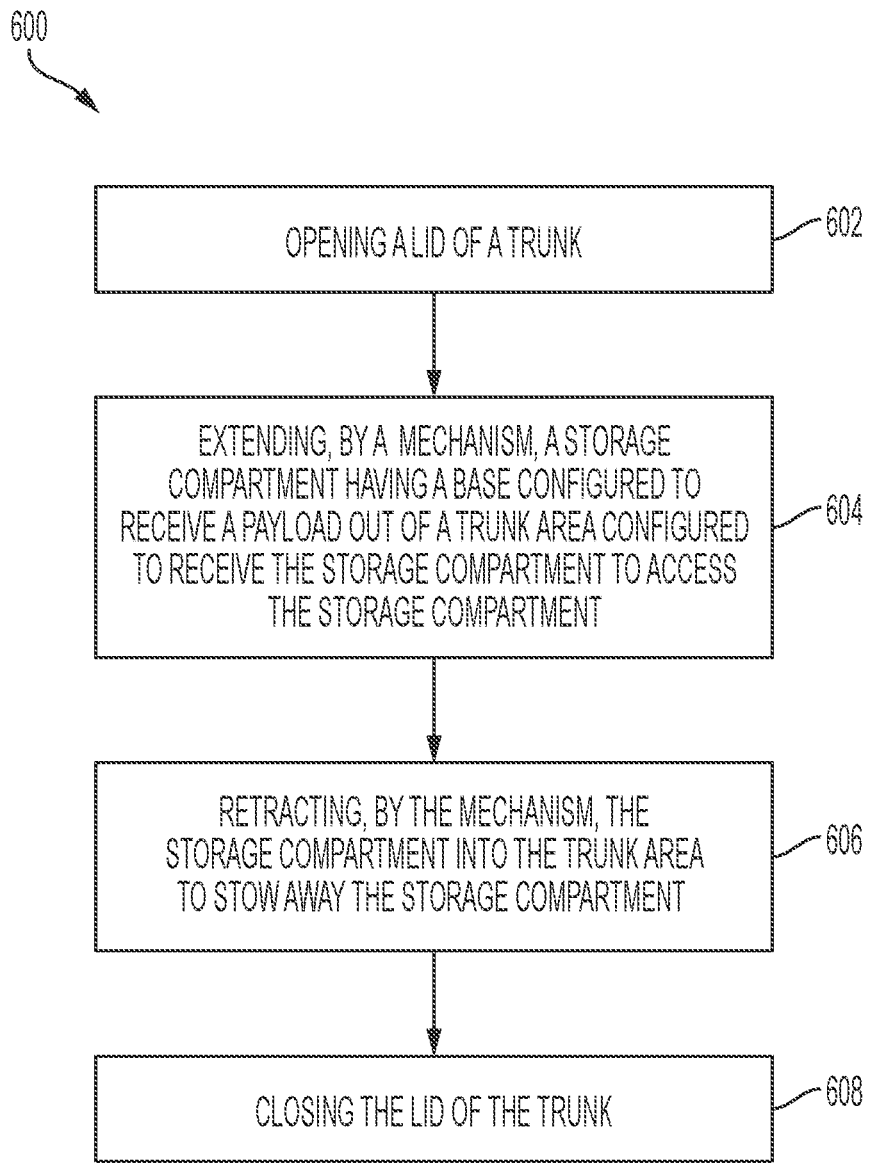
FIG. 6 illustrates a flow diagram of a method for using a frunk/trunk according to an aspect of the present disclosure.

FIG. 6 illustrates a flow diagram of a method 600 for using a frunk/trunk of a vehicle. At 602, the trunk lid 106 of the frunk 102 is opened. For instance, the trunk lid 106 rotates about the hinge 108 to expose the trunk area 104. At 604, the storage compartment 110 disposed within the trunk area 104 is extended out of the trunk area 104. For instance, the mechanism 116 is configured to lift the storage compartment 110 out of the trunk area 104 such that the storage compartment 110 is more accessible. The storage compartment 110 may include the base 112 configured to receive a payload. At 606, the storage compartment 110 is retracted into the trunk area 104 to stow away the storage compartment 110. For instance, the mechanism 116 is configured to retract to set the storage compartment 110 back into the trunk area 104. At 608, the trunk lid 106 is closed. For instance, the trunk lid 104 rotates about the hinge 108 to enclose the trunk area 104. Generally, the mechanism 116 extends the storage compartment 110 when the trunk lid 106 is opened and retracts the storage compartment 110 when the trunk lid 106 is closed.

As described herein, the systems, vehicles, and methods enable users to have convenient, easy and ergonomic access to a frunk and/or a trunk of a vehicle. The depth and size of a frunk storage area may make is difficult to reach items stored within. Accordingly, the movable configuration of the system for the frunk and/or storage compartment located within the frunk improves the ergonomics for the user to be able to easily access the items in the frunk.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for providing access to a storage area on or within a vehicle, the system comprising:
    a storage compartment having a base configured to receive a payload;
    a trunk area configured to receive the storage compartment; and
    a 4-bar link mechanism attachable to the storage compartment and configured to pivot about the trunk area and to traverse the storage compartment between an up position where the storage compartment extends out of the trunk area and over an end portion of the vehicle and a down position where the storage compartment is within the trunk area.

2. The system of claim 1, wherein the trunk area is located at a front of the vehicle.

3. The system of claim 1, wherein the 4-bar link mechanism is activated by pulling or pushing the storage compartment or by motor actuation.

4. The system of claim 1, wherein the 4-bar link mechanism is activated by lifting or closing a trunk lid manually, semi-automatically, or automatically.

5. The system of claim 1, wherein the storage compartment includes a plurality of walls surrounding the base to retain the payload on the base.

6. A vehicle having a system for providing access to a storage area on or within the vehicle, the vehicle comprising:
    a storage compartment having a base configured to receive a payload;
    a frunk area configured to receive the storage compartment; and
    a 4-bar link mechanism attachable to the storage compartment and configured to pivot about the frunk area and to traverse the storage compartment between an up position where the storage compartment extends out of the frunk area and over a front end of the vehicle and a down position where the storage compartment is within the frunk area.

7. The vehicle of claim 6, wherein the 4-bar link mechanism is activated by pulling or pushing the storage compartment or by motor actuation.

8. The vehicle of claim 6, wherein the 4-bar link mechanism is activated by lifting or closing a frunk lid manually, semi-automatically, or automatically.

9. The vehicle of claim 6, wherein the storage compartment includes a plurality of walls surrounding the base to retain the payload on the base.

10. A method for accessing a storage area on or within a vehicle, the method comprising:
    opening a trunk lid;
    extending, by a 4-bar link mechanism configured to pivot about a trunk area, a storage compartment out of the trunk area and over an end portion of the vehicle to access the storage compartment, the storage compartment having a base configured to receive a payload, the trunk area being configured to receive the storage compartment;
    retracting, by the 4-bar link mechanism, the storage compartment into the trunk area to stow away the storage compartment; and
    closing the trunk lid.

11. The method of claim 10, wherein the trunk area is located at a front of the vehicle.

12. The method of claim 10, wherein the 4-bar link mechanism extends the storage compartment when pulled and retracts the storage compartment when pushed.

13. The method of claim 10, wherein the 4-bar link mechanism extends the storage compartment when the trunk lid is opened and retracts the storage compartment when the trunk lid is closed.

14. The method of claim 10, wherein the storage compartment includes a plurality of walls surrounding the base to retain the payload on the base.

* * * * *